June 9, 1953   B. A. PARR   2,641,396
LUGGAGE CARRIER FOR VEHICLES
Filed Aug. 7, 1950
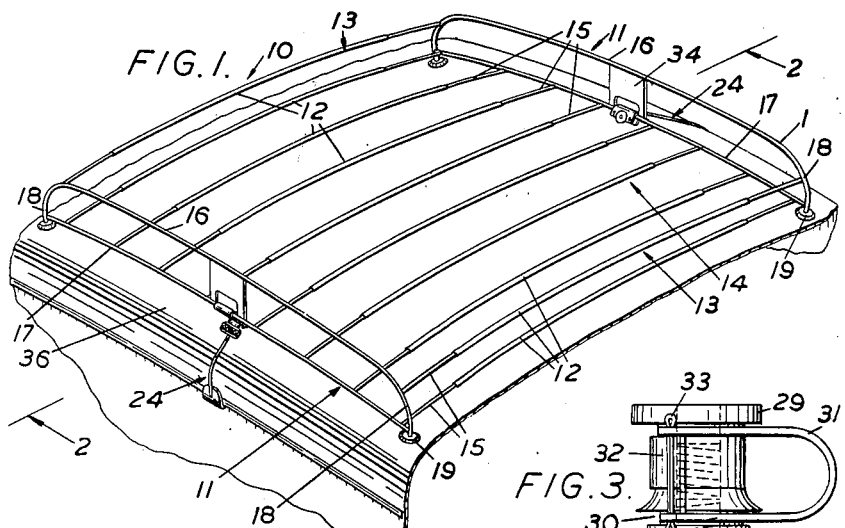
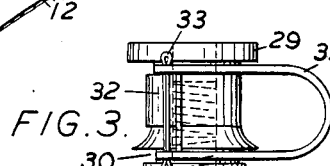
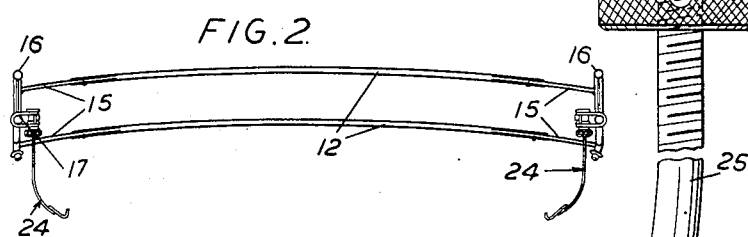
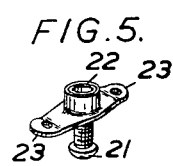
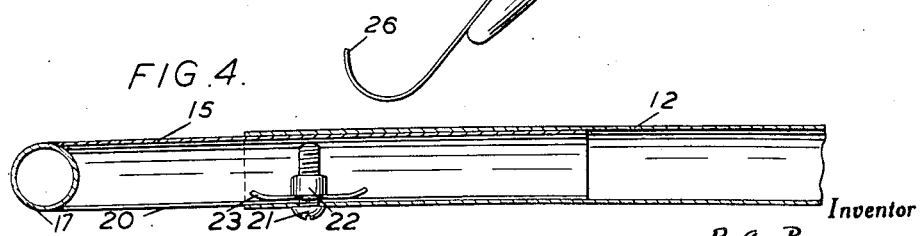
Inventor
B. A. Parr
By
Watson, Cole, Grindle & Watson
Attorney

UNITED STATES PATENT OFFICE 2,641,396

LUGGAGE CARRIER FOR VEHICLES

Bernard Arthur Parr, East Sheen, London, England

Application August 7, 1950, Serial No. 177,998
In Great Britain August 11, 1949

3 Claims. (Cl. 224—42.1)

This invention relates to luggage carriers for vehicles and more particularly to luggage carriers of the kind adapted to be secured to the roofs of motor cars.

The object of my invention is to provide a luggage carrier of this kind which is readily adjustable in width to suit the roofs of different cars and which can be readily disassembled for ease of storage or transport.

The luggage carrier according to my invention consists of a frame comprising longitudinal side sections, and a plurality of transverse frame members each adjustably secured to the said side sections whereby the width of the frame can be varied as required to suit the roof of any particular car.

Each longitudinal side section may have a plurality of transverse stub members extending therefrom, the transverse frame members being adjustably secured to the said stub members, and one specific form of luggage carrier having longitudinal side sections of this construction is shown in the accompanying drawing, in which Figure 1 is a perspective view of the carrier shown secured to the roof of a motor car;

Figure 2 is a sectional view of the luggage carrier as on the line 2—2 of Figure 1;

Figure 3 is a side view, drawn to an enlarged scale, of the securing means for the carrier;

Figure 4 is a partial sectional view, drawn to an enlarged scale, showing a transverse frame member adjustably secured to a stub member, and Figure 5 is a perspective view of the nut and bolt fastening shown in Figure 4.

The luggage carrier shown in the drawing comprises an open-topped frame 10 of generally cuboidal configuration and having two similar longitudinal side sections 11, 11, a plurality of transverse frame members 12 forming two similar transverse side sections 13, 13, and a plurality of similar transverse frame members 12 forming the base 14 of the frame, all of the said transverse frame members 12 being adjustably secured to stub members 15 projecting normally from the longitudinal side sections 11, 11.

Each longitudinal side section 11 comprises spaced upper and lower tubular members 16 and 17 respectively. The upper member 16 of each side section 11 has downwardly-curved extensions 18 to which the lower member 17 is welded, brazed or otherwise secured at a point spaced from the free end of the extensions 18 so that such extensions form feet to which mounting blocks 19 of rubber or other suitable material are secured.

Secured to each lower tubular member 17 to extend normally thereto is a plurality of stub tubes 15 having a slot 20 (Figure 4) extending the whole or substantially the whole length thereof. Similar stub tubes 15 project at right angles from the upper ends of the extensions 18 of the upper tubular members 16, as shown in Figures 1 and 2.

The transverse frame members 12 forming the base 14 and the transverse side sections 13, 13 of the luggage carrier 10 each comprises a tube having adjacent each end thereof a hole that receives a bolt 21 that is screwed into a nut 22 which is preferably self-locking and which is housed within the tube, the nut at its base having opposed flanges 23 which prevent the nut from rotating in the tube.

With the bolts 21 partly screwed into the nuts 22 the stub tubes 15 on each side section 11 may be inserted within the transverse tubes 12, the shanks of the bolts 21 passing through the slots 20 in the stub tubes, to give a luggage carrier of any desired width. The transverse tubes 12 are secured to the stub tubes 15 in any desired adjusted position by tightening bolts 21 whereby each stub tube adjacent the slot therein is clamped between the transverse tube 12 and the base of the nut 22. The transverse members 12 and the tubular members 17 of the longitudinal side sections 11 are slightly arched so that the luggage carrier may conform to the contour of the roof of a motor car.

The luggage carrier includes means whereby it may be secured to the roof of a motor car and a preferred form of securing means, which is shown in the drawing, comprises two clamps 24 each having a screwed shank 25 and a hook portion 26 at its lower end for engaging a longitudinally extending roof gutter. Threaded on the shanks 25 of the clamps are circular nuts 27 each having a lower portion 28 of enlarged diameter and integral therewith a collar 29 which is joined to nut 27 by a part of reduced diameter to provide an annular groove 30. The clamps are each rotatably secured to the tubular member 17 of a side section 11, centrally of such tubular member, by a U-shaped sheet metal clip member 31, the sides of which embrace the tubular member 17 and are recessed to extend one beneath the upper flange of collar 29 and the other within the groove 30, the nut 27 with its collar 29 being rotatably secured to clip member 31 by a keeper plate 32 removably held in position by split pins 33 extending through holes in the sides of member 31 on either side of the recesses in the sides.

Each side section 11 of the carrier includes a plate 34 which is secured to the upper and lower tubular members 16, 17 centrally thereof to brace such members and which is provided with an opening 35 receiving a clip member 31, the plates 34 thus serving also to locate the clamps.

With the luggage carrier placed in position on the roof 36 of a motor car, as shown in Figure 1, the hook portions 26 of the clamps are engaged beneath the roof gutters and the nuts 27 are tightened to firmly clamp the carrier to the roof. To facilitate turning of nuts 27, the enlarged portion 28 of the nut is preferably knurled as shown and may be provided with holes 37 to receive a tommy bar.

In Figures 1 and 2 of the drawing the bight of the clip members 31 is shown extending outwardly of the tubular members 17. In some cases, however, such disposition of the clip members may provide insufficient clearance between such members and the car roof. In these cases the clip members are reversed so that the bight of the clip members extends inwardly of tubular members 17 and the nut members are inverted so that the collar 29 is lowermost, the disconnectible securing means shown enabling either arrangement to be readily obtained as desired.

My improved luggage carrier can be readily adjusted within limits to give a carrier of any desired width and can be readily assembled and disassembled. When disassembled the parts can be packed into a container occupying little space, thus facilitating storage and transport of the carrier. A carrier constructed as shown in the drawing and adapted to be used with a wide range of cars at present in use may be packed into a container measuring approximately 8" x 7" x 42".

It is not necessary that the various members of the carrier be of circular section and they may be of any other suitable section. Moreover, other means than those illustrated may be provided for adjustably securing the transverse frame members to the stub members projecting from the longitudinal side sections. Each pair of transverse members 12 forming the transverse side sections could be secured together in the desired spaced relationship by vertical struts. Furthermore the transverse members forming the base of the carrier could be rigidly secured together in pairs, thus giving added strength to the base of the carrier.

The longitudinal side sections of the frame instead of being provided with stub members could be otherwise formed to co-operate with the transverse frame members adjustably to secure such transverse frame members to the said side sections.

I claim:

1. A luggage carrier adapted to be secured to the roof of a motor car and comprising a frame composed of two rigid longitudinal side sections, each having a plurality of stub members extending therefrom, and a base comprising a plurality of hollow transverse members, said transverse members and said stub members having a sliding fit, one within the other, affording a telescoping relation therebetween, whereby the width of the frame may be varied, and means for rigidly securing the transverse members to the stub members in any desired adjusted telescoped relation thereof.

2. A luggage carrier as claimed in claim 1, wherein each longitudinal side section has at each end thereof a stub member extending from the said side section and spaced vertically from the bottom of the frame, and wherein transverse members are adjustably secured to such end stub members to form transverse side sections of the frame.

3. A luggage carrier as claimed in claim 1, wherein the stub members are in the form of longitudinally slotted tubes and said transverse members are tubular, and wherein the stub members extend within the tubular transverse members, and including means securing said stub members to said tubular transverse members, said last means comprising nuts housed within said tubular transverse members and bolts whose shanks extend through the slots in the stub members and are threaded into the nuts.

BERNARD ARTHUR PARR.

References Cited in the file of this patent

UNITED STATES PATENTS

| Number | Name | Date |
|---|---|---|
| 2,262,800 | Farmer | Nov. 18, 1941 |
| 2,436,228 | Purchase | Feb. 17, 1948 |
| 2,444,201 | Lecanu-Deschamps | June 29, 1948 |

FOREIGN PATENTS

| Number | Country | Date |
|---|---|---|
| 776,636 | France | Nov. 8, 1934 |
| 833,749 | France | July 25, 1938 |
| 866,287 | France | Apr. 21, 1944 |